United States Patent Office 3,364,181
Patented Jan. 16, 1968

3,364,181
CYCLIC CARBAMATE RESINS AND
METHOD OF PREPARATION
Max E. Elder and Carl Moore, Midland, Mich., assignors to The Dow Chemical Company, Midland, Mich., a corporation of Delaware
No Drawing. Continuation-in-part of application Ser. No. 177,250, Mar. 5, 1962, which is a continuation-in-part of application Ser. No. 114,302, June 2, 1961. This application Nov. 10, 1965, Ser. No. 507,235
2 Claims. (Cl. 260—77.5)

This application is a continuation-in-part of U.S. patent application Ser. No. 177,250, filed Mar. 5, 1962, now abandoned, which latter case is a continuation-in-part of U.S. patent application Ser. No. 114,302, filed June 2, 1961, now abandoned.

This invention concerns water-insoluble, polymeric, vinylbenzyl cyclic carbamate resins and their method of preparation.

Previous investigators have prepared N-vinyl-5-methyl-2-oxazolidinone and its water-soluble homopolymer, known as PVOM, which has found use as a water-soluble complexing agent.

The present invention makes possible the utilization of the complexing properties of oxazolidinone, oxazinidinone and oxazepidinone groups without the disadvantages of having a water-soluble oxazolidinone, oxazinidinone or oxazepidinone reactant. Until the present time, it was not known how to make a water-insoluble, resinous polymer which would afford both the advantages of the aforementioned groups for forming complexes with aqueous-phase reactants and the advantages of water insolubility, so that a separation could be had from an aqueous medium of a complexed, water-insoluble, resinous polymer containing such groups.

It has now been discovered that water-insoluble, polymeric oxazolidinones, oxazinidinones and oxazepidinones can be prepared by reacting an alkali metal salt of a 2-oxazolidinone, 2-oxazinidinone or 2-oxazepidinone, having the formula

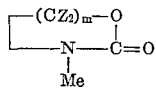

wherein Z is independently selected from the group consisting of hydrogen, 1 to 4 carbon alkyl groups and 6 to 10 carbon aryl groups, and wherein only one aryl group may be present, m is an integer from 2 to 4, and Me is an alkali metal with a chloromethylated styrene polymer having 0.75 to 1.5 chloromethyl groups per available styrene nucleus, crosslinked with between 0.9 and 5 mole percent, styrene polymer basis, of a crosslinking agent having two vinylidene groups, in stoichiometric or substantially stoichiometric proportions.

The reaction schematically is as follows:

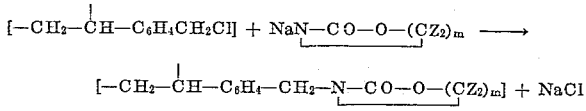

wherein the first reactant represents a chloromethylated styrene polymer moiety and the second reactant represents a 3-sodio-2-oxazolidinone or equivalent-oxazinidinone or -oxazepidinone or its alkyl or aryl substituted derivatives, as specified in the preceding paragraph.

The chloromethylated resinous polymers utilized in the process of this invention are those of styrene crosslinked with between about 0.9 and 5 mole percent, styrene polymer basis, of a conventional crosslinking agent having two vinylidene groups, e.g., divinylbenzene, divinyltoluene, divinylxylene, divinylethylbenzene, divinyl-naphthalene, vinyl acrylate, diacrylate esters, dimethacrylate esters, diallyl esters, methylenebisacrylamide, etc. These are conventional polymers used, for example, in making anion exchange resins by reaction with an amine.

Advantageously, these chloromethylated crosslinked copolymers are prepared in two stages. First, a conventional oil-in-water suspension polymerization process, as used in making ion exchange resins having a polymeric styrene matrix, is used wherein resinous styrene polymers, crosslinked as specified are obtained as discrete beads or spheroids. These latter are then chloromethylated in usual ways, e.g., with a mixture of formaldehyde and hydrochloric acid or a mixture of a dihalide and a Friedel-Crafts catalyst, as described in Organic Reactions, vol. I, page 63 et. seq., John Wiley & Sons, Inc., 1942. Alternatively, the chloromethylstyrene monomer together with crosslinking agent can be polymerized in mass or in organic solution to give chloromethylated crosslinked styrene polymers equally advantageous in the practice of this invention.

The chloromethylated, crosslinked, styrene polymers obtained by either of the above methods are reacted in admixture with a stoichiometric or substantially stoichiometric proportion and up to 10 percent excess of an alkali metal salt of a 2-oxazolidinone, a 2-oxazinidinone or a 2-oxazepidinone, as specified, advantageously formed in situ from the corresponding 2-oxazolidinone, 2-oxazinidinone or 2-oxazepidinone compound and free alkali metal or alkali metal alkoxide, advantageously of a 1 to 4 carbon monohydric alcohol. Representative thereof are the alkali metal salts of 5-methyl-2-oxazolidinone, 5-phenyl-2-oxazolidinone, 2-oxazinidinone, 5-ethyl-2-oxazolidinone, 5-methyl-oxazepidinone, 4,5-dimethyl-2-oxazolidinine, and the like within the scope of the graphic formula given above. All of these compounds are closely related structurally, all have the critical —N—C(O)— group which does the complexing. The rest of their structure is not cirtical as to the kind and number of substituents within the description as given above. As a practical matter, sodium is the alkali metal of choice. Other alkali metal salts are operable.

The reaction is advantageously carried out in the presence of an organic swelling agent for the chloromethylated, resinous, styrene polymers, i.e., a swelling agent which swells resinous chloromethylstyrene polymers and does not react with alkali metal or alkali metal alkoxides under reaction conditions, in amount sufficient to provide a fluid, stirrable slurry. Such swelling agents are chloroform, tetrachloroethane, o-dichlorobenzene, cisdichloroethylene, trichloroethylene, Tetralin, pentachloroethane, methylchloroform, dioxane, tetrahydrofuran, dimethylformamide, perchloroethylene, carbon tetrachloride, ethylidenedichloride, chlorobenzene, toluene, ethylbenzene, benzene, xylene and cyclohexane. The 2-oxazolidinone, 2-oxazinidinone or 2-oxazepidinone compound itself, in excess, can also be used as a swelling agent.

The reaction between the admixture of polymeric chloromethylstyrene resin and the alkali metal salt is carried out at a temperature between about 65° and 150° C. for a time sufficient to displace at least 60 percent of the benzylic chloride, i.e., the chloride present in the chloromethyl groups, which displacement can be followed by periodic analyses. The reaction is carried out at atmospheric, sub-atmospheric or super-atmospheric pressure. Generally, atmospheric or substantially atmospheric pressure is most advantageous.

The following examples describe specific embodiments and the best mode contemplated by the inventors of carrying out their invention in polymeric 3-ar-vinylbenzyl-2-oxazolidinones, -oxazinidinones and oxazepidinones, i.e., the vinylbenzyl moieties of the chloromethyl polymers react with the 2-oxazolidinone and equivalent alkali metal salts at the 3-position, the nitrogen position.

Example 1

A quantity of 102.6 grams of dioxane-wetted, chloromethylated, resinous, polymeric styrene beads, crosslinked with one mole percent of divinylbenzene (equivalent to 76.3 grams of dry beads or 0.5 gram mole, chloromethylstyrene basis) and 1.5 liters of dry dioxane were charged to a 2-liter, 3-neck resin flask provided with a condenser, stirrer and thermometer. A quantity of 31.3 grams of 95 percent pure sodium methylate (0.55 gram mole) was added thereto with stirring. To the stirred mixture was added 55.61 grams of 5-methyl-2-oxazolidinone. The reaction mixture was continually stirred and kept at 89° C. for 5 hours and 50 minutes. The flask contents were cooled to room temperature, and the product beads were suction filtered, washed with one liter of dioxane, suction filtered again, washed twice with 1.5 liter portions of water, and finally washed with methanol. The product beads were dried in a vacuum oven at 60° C. for 16 hours. Product yield was then 99.6 grams. Analysis of the product showed a nitrogen content of 5.06 percent and a chlorine content of 1.02 percent, which is equivalent to a conversion of 86.5 percent, based on reactant chloromethylated resin beads.

The procedure described above when repeated with a substitution of any of the other 2-oxazolidinone, -oxazinidinone or -oxazepidinone compounds, as specified herein above, in place of 5-methyl-2-oxazolidinone gives similar products.

Example 2

A 1-liter, 3-neck resin flask provided with condenser, stirrer, and thermometer was charged with 202 grams of 5-methyl-2-oxazolidinone and heated to 80° C. Small pieces of sodium metal were added to the flask with stirring over a period of 20 minutes until 5.8 grams (0.25 mole) were added. Within an additional 30 minute period, all of the sodium metal had reacted to give the sodium salt of 5-methyl-2-oxazolidinone. The temperature was not allowed to go above 110° C. during the sodium reaction. Then 45 grams (38.14 grams on a dry basis or 0.25 gram mole) of the chloromethylated resin beads as in Example 1, previously washed in 5-methyl-2-oxazolidinone, was added and the slurry was stirred for 6 hours. Temperature was maintained at 80° C. At the end of the reaction period the beads were suction filtered to remove excess oxazolidinone, then washed with water four times and filtered after each washing. A final wash was with acetone. After drying in a vacuum oven at 60° C., the weight of the product beads was 53.0 grams. Analysis showed a nitrogen content of 6.03 percent and a chlorine content of 2.88 percent. The conversion was calculated to be 88 percent of the theoretical, based on reactant chloromethylated resin beads.

Example 3

A quantity of 38.6 grams, dry basis, of resinous, chloromethylated, polystyrene beads containing about 0.9 chloromethyl groups per aryl nucleus and crosslinked with 4 percent divinylbenzene, and 100 ml. of 5-methyl-2-oxazolidinone were charged with stirring to a reaction flask containing a substantially stoichiometric equivalent of the sodium salt of 5-methyl-2-oxazolidinone at 80° C. The resulting slurry was stirred for about 15 hours while its temperature was maintained at between 80° and 150° C. The resulting product beads were filtered and washed consecutively with water, methanol and water. Analysis of the yellow product beads gave a chlorine content of 0.13 percent, a nitrogen content of 6.48 percent and a water content of 23.0 percent.

The procedure described above when repeated with a substitution of 5-ethyl-2-oxazolidinone in place of the 5-methyl homolog gives a similar product.

Example 4

A quantity of 51.755 grams of dry beads of 1 percent divinylbenzene - crosslinked polymeric 3 - vinylbenzyl - 5-methyl-2-oxazolidinone resin was placed in a 1½ inch diameter glass tube about 21 inches long, and through it was passed a stream of nitrogen gas containing 3.3 weight percent sulfur dioxide for about 30 minutes. The reaction temperature was about 28° C. At the end of the run, the resin beads had adsorbed 0.34 ml. of gaseous sulfur dioxide per gram of beads.

Example 5

A quantity of one gram of dry beads of 1 percent divinylbenzene - crosslinked polymeric 3 - vinylbenzyl - 5-methyl-2-oxazolidinone was slurried with 100 ml. of aqueous 1 percent aniline for 24 hours. The beads were allowed to settle out and an analysis was run on an aliquot of the supernatant liquid. By difference, the amount of aniline complexed was 0.1 gram per gram of dried resin beads or 10 weight percent.

The resins of this invention can be used for complexing a variety of compounds from a gas phase or from solution.

What is claimed is:

1. Method for making a water-insoluble resinous polymeric vinylbenzyl cyclic carbamate resin by reacting (1) a substantially stoichiometric proportion of a compound having the formula

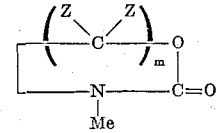

wherein each Z is independently selected from the group consisting of hydrogen, 1 to 4 carbon alkyl groups and 6 to 10 carbon aryl groups, $m$ is an integer from 2 to 4, wherein only one aryl group may be present, and wherein Me is an alkali metal, in admixture with (2) a resinous crosslinked ar-chloromethylstyrene polymer having from about 0.75 to 1.5 chloromethyl groups per styrene nucleus and crosslinked with between 0.9 and 5 mole percent, styrene polymer basis, of divinylbenzene (3) at a temperature between about 65° C. and 150° C. (4) for a time sufficient to displace at least 60 mole percent of benzylic chloride.

2. Product of the process of claim 1.

No references cited.

DONALD E. CZAJA, *Primary Examiner.*

L. J. BERCOVITZ, *Examiner.*

F. McKELVEY, M. C. JACOBS,
*Assistant Examiners,*